United States Patent
Mochizuki

(10) Patent No.: US 12,032,162 B2
(45) Date of Patent: Jul. 9, 2024

(54) IMAGE PROJECTOR

(71) Applicant: KOITO MANUFACTURING CO., LTD., Tokyo (JP)

(72) Inventor: Kohei Mochizuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/025,222

(22) PCT Filed: Sep. 6, 2021

(86) PCT No.: PCT/JP2021/032683
§ 371 (c)(1),
(2) Date: Mar. 8, 2023

(87) PCT Pub. No.: WO2022/054760
PCT Pub. Date: Mar. 17, 2022

(65) Prior Publication Data
US 2024/0027764 A1    Jan. 25, 2024

(30) Foreign Application Priority Data
Sep. 9, 2020  (JP) .................... 2020-151138

(51) Int. Cl.
*G02B 27/01* (2006.01)
*G02F 1/1333* (2006.01)

(52) U.S. Cl.
CPC ... *G02B 27/0149* (2013.01); *G02F 1/133308* (2013.01); *G02B 2027/0161* (2013.01); *G02B 2027/0169* (2013.01); *G02F 2203/01* (2013.01)

(58) Field of Classification Search
CPC .... G02B 2027/0161; G02B 2027/0112; G02B 27/0101; G02B 27/0149; G02B 27/0172; G02B 27/0176
See application file for complete search history.

(56) References Cited

U.S. PATENT DOCUMENTS

2013/0057159 A1    3/2013  Pijlman et al.
2016/0379498 A1   12/2016  Aoki
(Continued)

FOREIGN PATENT DOCUMENTS

CN    109154721 A  *  1/2019  ............. B60K 35/00
CN    106461195 B  *  7/2019  ............. B60K 35/00
(Continued)

OTHER PUBLICATIONS

International Search Report of PCT/JP2021/032683 dated Nov. 22, 2021 [PCT/ISA/210].
(Continued)

*Primary Examiner* — Mariceli Santiago
(74) *Attorney, Agent, or Firm* — Sughrue Mion, PLLC

(57) ABSTRACT

An image projector is provided for which assembly work and optical axis adjustment are easy while visibility at both sides of an image is secured. This image projector includes a lighting substrate, a lens part that adjusts an optical axis of emitted light from light-emitting elements, and an image display part which displays an image on a display surface and through which the emitted light is transmitted. The display surface of the image display part has a central region and side regions located on both sides. In the lens part, a first lens region corresponding to the central region and second lens regions corresponding to the side regions are integrally formed. Radiation directions of light having passed through the second lens regions are more inclined toward laterally outer sides than a radiation direction of light having passed through the first lens region.

8 Claims, 7 Drawing Sheets

(56) References Cited

U.S. PATENT DOCUMENTS

| | | | |
|---|---|---|---|
| 2017/0322415 A1 | 11/2017 | Irzyk | |
| 2019/0121128 A1 | 4/2019 | Kasahara et al. | |
| 2019/0179143 A1 | 6/2019 | Nambara | |
| 2020/0041788 A1 | 2/2020 | Lee et al. | |
| 2020/0339147 A1 | 10/2020 | Hayakawa et al. | |

FOREIGN PATENT DOCUMENTS

| | | | | |
|---|---|---|---|---|
| CN | 111025642 A | | 4/2020 | |
| JP | 2017174542 A | * | 9/2017 | ............ B60K 35/00 |
| JP | 2017-207622 A | | 11/2017 | |
| JP | 2018-502759 A | | 2/2018 | |
| JP | 2019-119262 A | | 7/2019 | |
| JP | 2022110898 A | * | 7/2022 | |
| WO | 2015/182892 A1 | | 12/2015 | |
| WO | 2017/183556 A1 | | 10/2017 | |
| WO | WO-2018030023 A1 | * | 2/2018 | ............ B60K 35/00 |

OTHER PUBLICATIONS

Communication dated May 2, 2024 issued by the European Patent Office in application No. 21866719.4.

\* cited by examiner

IMAGE PROJECTOR

CROSS REFERENCE TO RELATED APPLICATIONS

This application is a National Stage of International Application No. PCT/JP2021/032683 filed on Sep. 6, 2021, claiming priority based on Japanese Patent Application No. 2020-151138 filed on Sep. 9, 2020.

TECHNICAL FIELD

The present invention relates to an image projector, particularly to an image projector that displays an image for a driver etc. inside a vehicle.

BACKGROUND ART

In recent years, the development of driving assistance technology and autonomous driving technology in which a computer takes charge of some or all of driving maneuvers, such as steering, acceleration, and deceleration of a vehicle, has been progressing. Also under development is travel assistance technology that enhances safety and comfort during travel in manual driving in which a person performs vehicle driving maneuvers by equipping the vehicle with various sensors and a plurality of communication devices and obtaining information on the state of the vehicle and the surrounding conditions.

In such driving assistance technology, autonomous driving technology, or travel assistance technology, various pieces of information obtained, such as the state of the vehicle, the surrounding conditions, and the status of driving maneuvers of the computer, are presented to an occupant using images etc. Conventionally, a common way to present various pieces of information is to install an image display device inside the vehicle and display letters and images on the image display device.

However, presenting information by an image display device provided in a vehicle is not preferable, as it requires an occupant or a driver to look at the image display device by diverting his or her line of sight away from the front side in the traveling direction. To present image information while reducing the movement of the line of sight from the front side of the vehicle, a head-up display (HUD) device that projects an image on a windshield of a vehicle and allows reflected light to be visually recognized has been proposed (e.g., see Patent Literature 1).

In the HUD device of the conventional technology described in Patent Literature 1, a picture generation unit (PGU), a flat mirror, and a concave mirror are mounted in a housing. This HUD device displays an image on a liquid crystal or the like inside the PGU, irradiates the image with light radiated from a light source, reflects the image multiple times by the flat mirror and a magnifying mirror, and allows an occupant to visually recognize the image through reflection of the windshield of the vehicle. By repeatedly reflecting the image radiated from the PGU by the flat mirror and the magnifying mirror, this HUD device can secure a length of an optical path and increase the size of the projected image.

CITATION LIST

Patent Literature

Patent Literature 1: Japanese Unexamined Patent Application Publication No. 2019-119262

SUMMARY OF THE INVENTION

However, the HUD device of the conventional technology has a problem in that, since the image radiated from the PGU is reflected by the magnifying mirror, a difference occurs in traveling direction of light between a central region and both sides of the image, resulting in reduced visibility of the entire image. To secure the visibility of the entire image, it is effective to provide a display part separately from a liquid crystal panel inside the PGU and individually dispose a light source and a lens optical system member. The problem, however, is that this increases the number of components and reduces the efficiency of assembly work. Another problem is that positioning of parts and alignment of optical axes are difficult due to the multiple display parts individually including the light source and the lens optical system member.

Having been contrived in view of these conventional problems, the present invention aims to provide an image projector for which assembly work and optical axis adjustment are easy while visibility on both sides of an image is secured.

To solve the above-described challenge, an image projector of the present invention is an image projector including: a lighting substrate on which a plurality of light-emitting elements is mounted; a lens part that adjusts an optical axis of emitted light from the light-emitting elements; and an image display part which displays an image on a display surface based on an image signal, and through the display surface of which the emitted light is transmitted as transmitted light, wherein: the display surface has a central region located at a center in a width direction and side regions located on both sides of the central region; in the lens part, a first lens region formed at a position corresponding to the central region and second lens regions formed at positions corresponding to the side regions are integrally formed; and radiation directions of light having passed through the second lens regions are more inclined toward laterally outer sides than a radiation direction of light having passed through the first lens region.

In this image projector of the present invention, since the lens part has the first lens region and the second lens regions integrally formed, and the radiation directions of light having passed through the second lens regions are more inclined toward the laterally outer sides than the radial direction of light having passed through the first lens region, the angle of incidence of light reaching the magnifying mirror can be varied between the central region and the side regions. Thus, assembly work and optical axis adjustment are made easy while visibility on both sides of an image is secured.

In one aspect of the present invention, of the image display part, the central region is formed by a transmissive liquid crystal panel and the side regions are fixed display panels on which a specific image is fixed.

In one aspect of the present invention, the image projector includes a diffusion sheet that covers a surface of the transmissive liquid crystal panel, and the fixed display panels are regions to which the diffusion sheet is extended and in which the specific image is fixed.

In one aspect of the present invention, the image projector includes, between the lighting substrate and the lens part, a spacer part that has openings formed at positions corresponding to the light-emitting elements, and, on a surface of the spacer part that faces the lighting substrate, a first light-blocking wall extending toward the lighting substrate is provided between the first lens region and a second lens region of the second lens regions.

In one aspect of the present invention, on the surface of the spacer part that faces the lighting substrate, a second light-blocking wall extending toward the lighting substrate is provided between the plurality of light-emitting elements inside the first lens region.

In one aspect of the present invention, in the spacer part, a first rib of which a distal end contacts the lens part is formed on a front surface and a second rib of which a distal end contacts the lighting substrate is formed on a back surface, and the first rib and the second rib are formed at the same position as seen in a plan view.

In one aspect of the present invention, the second rib contacts a region so as to avoid a wiring pattern on the lighting substrate.

In one aspect of the present invention, the lens part has a flat-plate portion that is integrally formed with the first lens region and the second lens regions; a plurality of support pillars is erected on the flat-plate portion toward the image display part; and distal end surfaces of the support pillars form the same inclined surfaces and contact a back surface of the image display part.

In one aspect of the present invention, distal ends of the support pillars contact borders between the central region and the side regions.

Advantageous Effects of Invention

The present invention can provide an image projector for which assembly work and optical axis adjustment are easy while visibility on both sides of an image is secured.

MODES FOR CARRYING OUT THE INVENTION

First Embodiment

Figure 1:
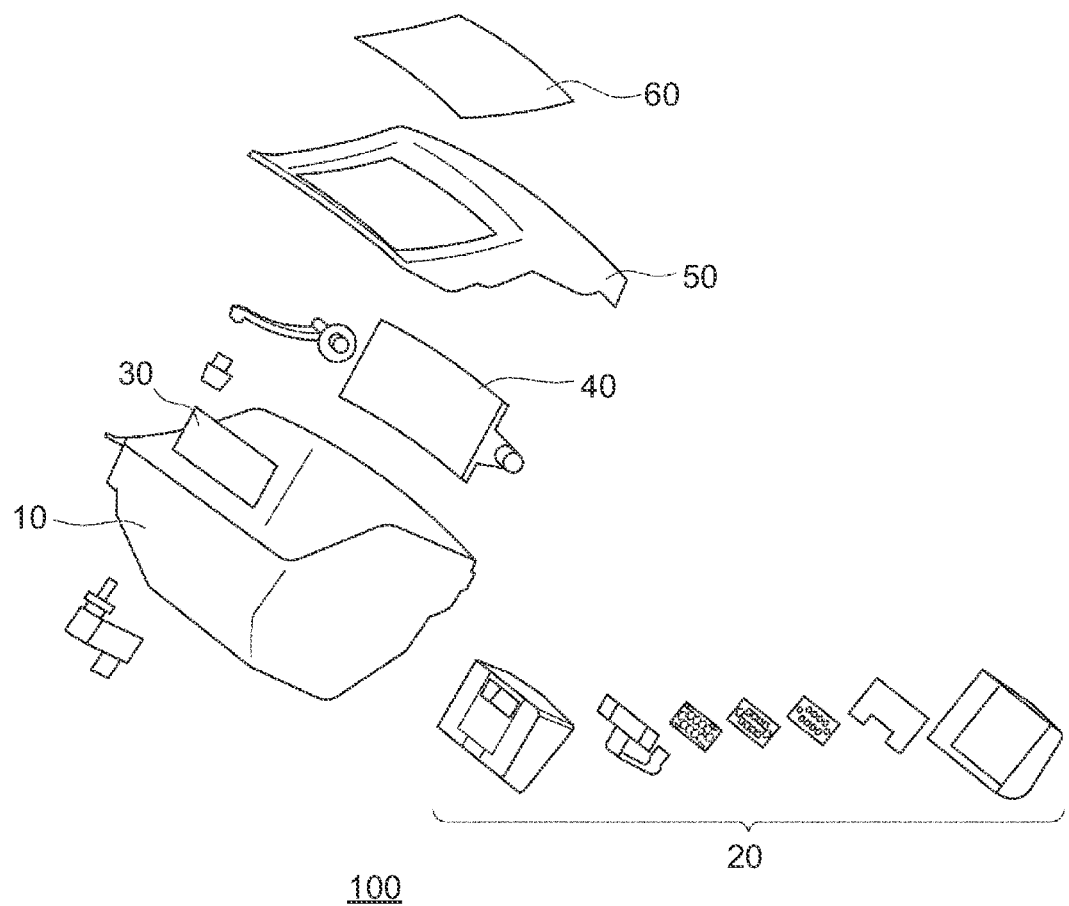
FIG. 1 is an exploded perspective view showing an overview of an image projector 100 according to a first embodiment of the present invention.

An embodiment of the present invention will be described in detail below with reference to the drawings. The same or equivalent constituent elements, members, and processes shown in the drawings are denoted by the same reference sign and overlapping description thereof will be omitted as appropriate. FIG. 1 is an exploded perspective view showing an overview of an image projector 100 according to this embodiment. As shown in FIG. 1, the image projector 100 includes a casing 10, a PGU 20, a flat mirror 30, a magnifying mirror 40, a top plate 50, and a translucent cover 60.

The casing 10 is a member that constitutes the outer shape of the image projector 100, and has a form of a container open at an upper side. The PGU 20 is mounted on an outer part of the casing 10, at a back surface side thereof (rightward in FIG. 1). Inside the casing 10, the flat mirror 30 and the magnifying mirror 40 are housed and held. The top plate 50 is attached to an open upper part of the casing 10, and an inside of the casing 10 is covered by the top plate 50. The material composing the casing 10 is not limited, and the casing 10 can be composed of metal or resin that is commonly used for an inside of a vehicle.

The PGU 20 is a unit that radiates light including an image toward the inside of the casing 10 based on electricity and a control signal supplied from an outside. The casing 10 has an opening (not shown) formed so as to correspond to a mounting position of the PGU 20, and light radiated by the PGU 20 is radiated to the inside of the casing 10 through this opening. The structure of the PGU 20 will be described later.

The flat mirror 30 is a flat plate-shaped member having a reflecting mirror formed on one surface, and is held on an inner side of the casing 10, at the front side (leftward in FIG. 1) of the casing 10. The mounting position of the flat mirror 30 lies on an optical path of light radiated by the PGU 20, and the flat mirror 30 is disposed so as to be inclined at a predetermined angle relative to the optical axis of the light from the PGU 20. Therefore, the light radiated by the PGU 20 is reflected after entering the flat mirror 30 and travels toward the rear surface of the casing 10.

The magnifying mirror 40 is a member having a curved surface shape with a reflecting mirror formed on one surface, and is held on the inner side of the casing 10, at a back side of the casing 10. The mounting position of the magnifying mirror 40 lies on an optical path of light reflected by the flat mirror 30, and the magnifying mirror 40 is disposed so as to be inclined at a predetermined angle relative to the optical axis of the light from the flat mirror 30. Therefore, the light reflected by the flat mirror 30 is reflected again after entering the magnifying mirror 40 and travels toward the translucent cover 60. In FIG. 1, a concave mirror curved in a left-right direction is shown as the curved surface shape of the magnifying mirror 40, but the magnifying mirror 40 may have any shape that is suitable to optical design for projecting an image.

The top plate 50 is a lid-like member disposed so as to cover the opening of the casing 10 that is opened at the upper part, and has an open part at a portion. While the structure, the shape, and the material of the top plate 50 are not limited, it is preferable that the top plate 50 have enough hermeticity to prevent dust etc. from entering inside the casing 10. The translucent cover 60 is mounted over the open part.

The translucent cover 60 is a plate-shaped member composed of a material that transmits visible light, and is disposed so as to cover the open part formed in the top plate 50. The mounting position of the translucent cover 60 lies on an optical path of light reflected by the magnifying mirror 40, and the translucent cover 60 transmits the light from the magnifying mirror 40 and radiates it to the outside of the image projector 100. The translucent cover 60 is located immediately under the windshield of the vehicle, and light transmitted through the translucent cover 60 enters and is reflected by the windshield.

The image projector 100 of this embodiment is installed on a cabin side of the vehicle, immediately under the windshield (not shown), and projects an image on the windshield. In the image projector 100, the PGU 20 radiates light and projects an image, and the light of the image is reflected inside the casing 10 by the flat mirror 30 and the magnifying mirror 40. The light of the image reflected by the magnifying mirror 40 is radiated on and reflected by the windshield (not shown) of the vehicle through the translucent cover 60, and the image is projected toward an occupant of the vehicle. The occupant visually recognizes the image through the light having entered his or her point of view. While this embodiment adopts the configuration in which light from the PGU 20 is reflected by the flat mirror 30 and reaches the magnifying mirror 40, a configuration in which the flat mirror 30 is not provided and the light from the PGU 20 directly reaches the magnifying mirror 40 may instead be adopted.

Figure 2:
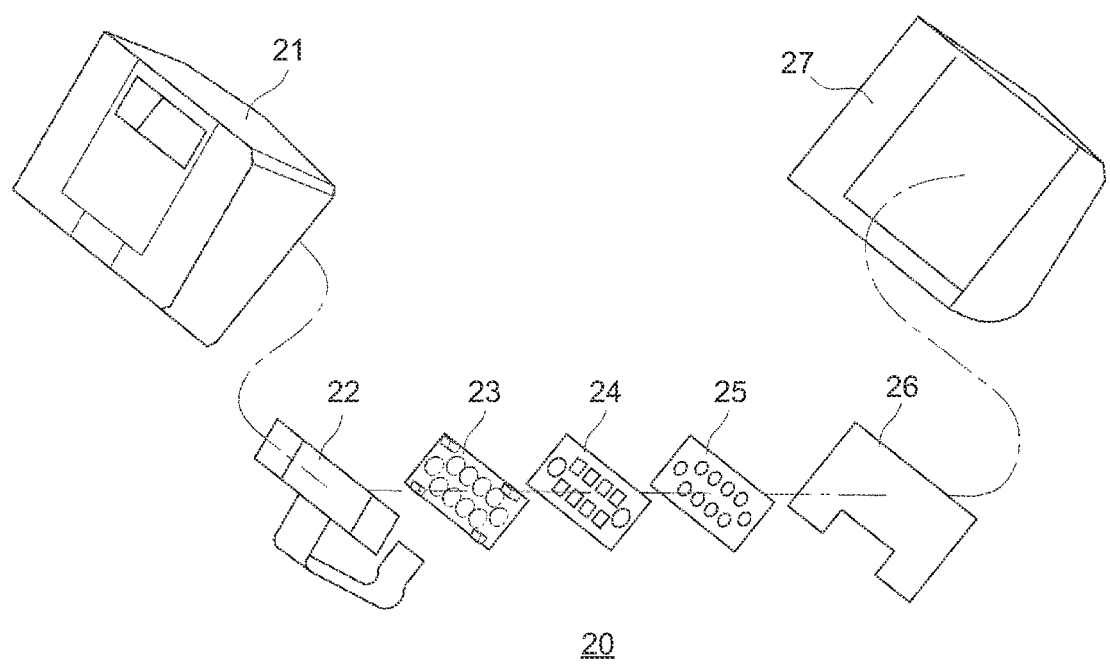
FIG. 2 is an exploded perspective view showing an overview of a PGU 20 of the image projector 100.

FIG. 2 is an exploded perspective view showing an overview of the PGU 20 of the image projector 100. As shown in FIG. 2, the PGU 20 includes a front housing 21, an image display part 22, a lens part 23, a spacer part 24, a lighting substrate a control board 26, and a rear housing 27.

The front housing 21 is a member constituting a part of the outer shape of the PGU 20 and is disposed in an image radiation direction of the PGU 20. The front housing 21 is partially provided with an opening, and this opening is formed at a position corresponding to an opening provided on the rear surface side of the casing 10. Light radiated from an image formation unit, to be described later, is radiated from the opening formed in the front housing 21 to the inside of the casing 10 through the opening of the casing 10.

The image display part 22 forms an image based on electricity and an image signal supplied from the control board 26. A liquid crystal display element can be used as the image display part 22, and the orientations of liquid crystal molecules are controlled on a pixel-by-pixel basis to thereby control transmission and non-transmission of light radiated from the rear surface side. The image display part 22 is positioned and fixed on the rear surface side of the front housing 21, and the light transmitted through the image display part 22 is radiated frontward through the opening of the front housing 21.

The lens part 23 is an optical member formed by a translucent material, and is a member that adjusts the spread angle of light radiated by the lighting substrate 25. In the example shown in FIG. 1 and FIG. 2, the lens part 23 has a plurality of convex lenses and also a plurality of support pillars both formed on a flat plate-shaped member. The lens part 23 is disposed on a rear surface side of the image display part 22, and the plurality of support pillars contacts the rear surface of the image display part 22 to secure a distance between the convex lenses and the image display part 22.

The spacer part 24 is a member that is disposed between the lens part 23 and the lighting substrate 25 to determine relative positions of the two as well as secure an interval therebetween. In the example shown in FIG. 1, the spacer part 24 has a substantially plate-like shape, and has a plurality of openings formed at positions corresponding to the convex lenses of the lens part 23. While the material composing the spacer part 24 is not limited, it is preferable that a light-blocking resin material be used to restrict regions at which the light radiated from the lighting substrate 25 enters the lens part 23 to the openings.

The lighting substrate 25 is a member having a plurality of LEDs mounted on a substrate in which wiring is formed, and the LEDs turn on and radiate light frontward based on electricity and a control signal supplied from the control board 26. In the example shown in FIG. 1, the arrangement of the LEDs mounted on the lighting substrate 25 corresponds to the convex lenses of the lens part 23 and the openings of the spacer part 24.

The image display part 22, the lens part 23, the spacer part 24, and the lighting substrate 25 constitute the image formation unit in the present invention. In the image formation unit, the LEDs of the lighting substrate 25 emit light based on electricity and a control signal from the control board 26, and the light from the LEDs enters the convex lenses of the lens part 23 through the openings of the spacer part 24. The image display part 22 displays an image based on electricity and an image signal from the control board 26, and light having entered the lens part 23 is transmitted through the image display part 22 with the spread angle adjusted, and the displayed image is projected frontward through the opening of the front housing 21.

The control board 26 is a member in which a wiring pattern is formed on a board and a plurality of electronic components is mounted to constitute a control circuit (control unit). Electricity and a signal are supplied to the control board 26 from the outside of the image projector 100, and predetermined information processing is executed by the control circuit formed on the board. The control board 26 controls driving of the image formation unit by transmitting electricity, an image signal, and a control signal to the image display part 22 and the lighting substrate 25 constituting parts of the image formation unit.

The rear housing 27 is a member constituting a part of the outer shape of the PGU 20 and is disposed on a back surface side (rear surface side) of the control board 26. The rear housing 27 is fitted to the front housing 21 to form a container, and the front housing 21 and the rear housing 27 correspond to a PGU housing in the present invention. Inside the PGU housing composed of the front housing 21 and the rear housing 27, the image formation unit and the control board 26 described above are housed.

Figure 3:
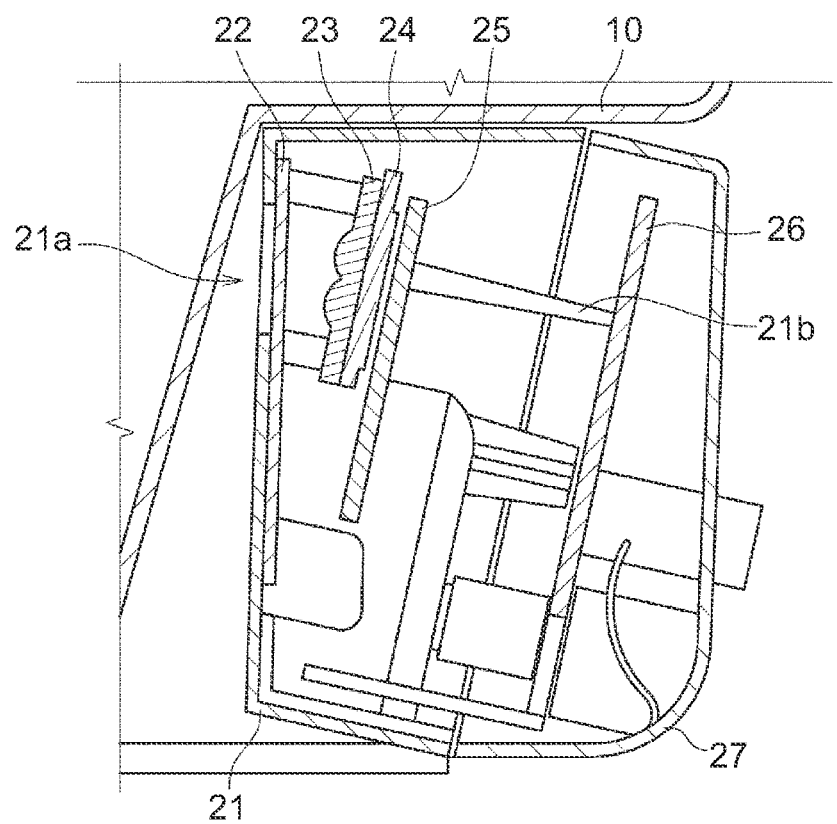
FIG. 3 is a schematic sectional view showing an assembled state of the PGU 20.

FIG. 3 is a schematic sectional view showing an assembled state of the PGU 20. As shown in FIG. 3, an opening 21*a* is formed in a front surface of the front housing 21, and the image display part 22 is adjacently disposed at a position corresponding to the opening 21*a*. The lens part 23 is disposed on the rear surface side of the image display part 22, and the support pillars protruding frontward from the flat-plate member of the lens part 23 contact the back surface of the image display part 22. As shown in the drawing, the height of the support pillars differs between the upper side and the lower side, and distal end surfaces thereof are inclined relative to the flat-plate member. Thus, the flat-plate member is disposed so as to be inclined relative to the back surface of the image display part 22. The spacer part 24 is disposed on the rear surface side of the lens part 23, and an interval between the lens part 23 and the lighting substrate 25 is secured as the lens part 23 and the lighting substrate 25 contact the front and back surfaces, respectively, of the spacer part 24. A positioning pin 21*b* is formed so as to protrude rearward from the front housing 21, and the position of the control board 26 inside the PGU housing is determined as a distal end of the positioning pin 21*b* contacts a front surface of the control board 26.

Figure 4:
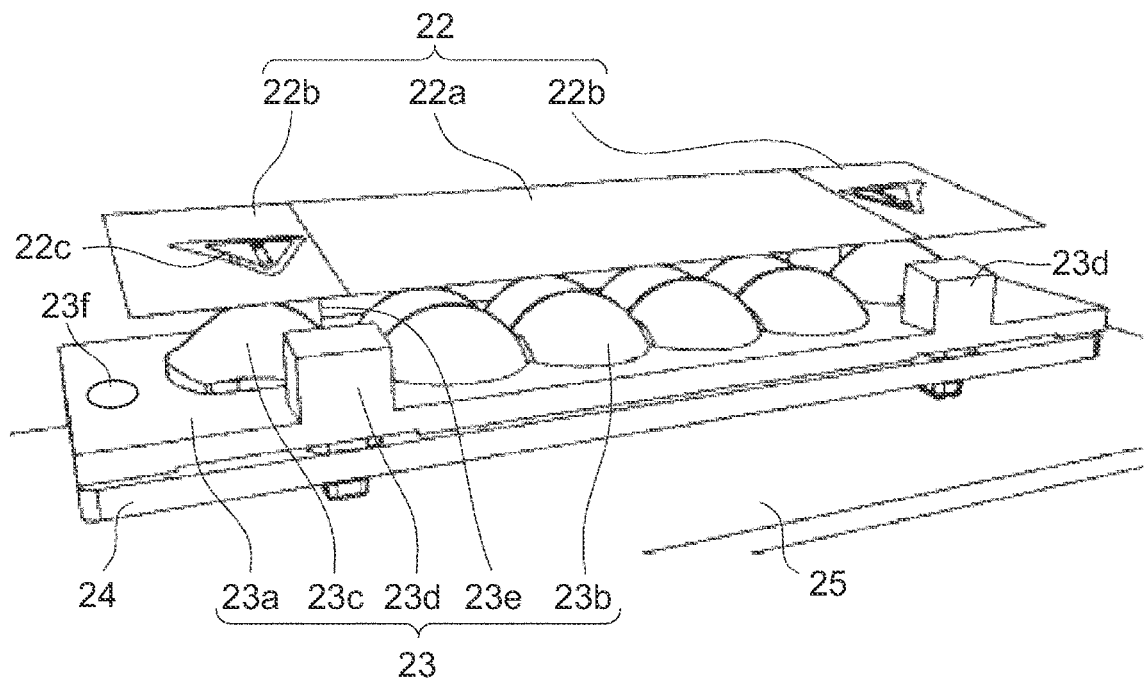
FIG. 4 is a schematic perspective view showing the structure of an image formation unit and shows a state where an image display part 22 is separated.

FIG. 4 is a schematic perspective view showing the structure of the image formation unit and shows a state where the image display part 22 is separated. As shown in FIG. 4, the spacer part 24 is disposed on the front surface of the lighting substrate 25, and the lens part 23 is disposed on the front surface side of the spacer part 24, with the interval between the lighting substrate 25 and the lens part 23 secured by the spacer part 24. The image display part 22 is disposed on a side of the lens part 23 from which light is emitted.

As shown in FIG. 4, a display surface of the image display part 22 is divided into a central region 22a and side regions 22b. The central region 22a and the side regions 22b together form a substantially rectangular flat plate shape. The lens part 23 includes a flat-plate portion 23a, a first lens region 23b, second lens regions 23c, support pillars 23d, 23e, and through-holes 23f.

The central region 22a is a region that is located at the center of the image display part 22 in a lateral width direction (a direction perpendicular to the plane of the sheet of FIG. 3) and displays a main content of an image projected by the image projector 100. The central region 22a can change the display content with time, and, for example, a translucent liquid crystal panel or the like is preferably used.

The side regions 22b are located on both sides of the central region 22a and display supplementary information of the image projected by the image projector 100. While the side regions 22b may change the display content with time, they may also continuously display a predetermined fixed image 22c.

The fixed image 22c is an image fixed inside display regions of the side regions 22b, and, for example, a shape of an icon for calling attention can be used. In the case where the fixed image 22c is displayed in the side regions 22b, image display elements need not be used as the side regions 22b, and a structure in which a light-blocking film and an image pattern are formed on a light-projecting plate-shaped member may be used. In particular, in the case where a transmissive liquid crystal panel is used as the central region 22a, a configuration may be adopted in which the surface of the transmissive liquid crystal panel is covered with a diffusion sheet that diffuses light, and this diffusion sheet is extended to the side regions 22b. By forming a light-blocking film, from which an image pattern is cut out, inside each side regions 22b of the diffusion sheet, the central region 22a and the side regions 22b can be formed integrally as the same plane.

The flat-plate portion 23a is a substantially flat plate-shaped portion that is integrally formed with the first lens region 23b, the second lens regions 23c, and the support pillars 23d, 23e. On a front surface side (the upper side in FIG. 4) of the flat-plate portion 23a, the first lens region 23b is formed at the center in the lateral width direction and the second lens regions 23c are formed on both sides of the first lens region 23b. Further, on the front surface side of the flat-plate portion 23a, the plurality of support pillars 23d, 23e is erected near borders between the first lens region 23b and the second lens regions 23c.

The first lens region 23b is a plurality of lens shapes formed at positions corresponding to the central region 22a of the image display part 22. The lens shapes of the first lens region 23b are formed at positions corresponding to a plurality of light-emitting elements, to be described later, and each refract light from the corresponding light-emitting element and thereby adjust an optical axis. While FIG. 4 shows an example in which distal end portions of cannonball-shaped lenses are arrayed in a 2-by-4 matrix, the shape and the number of lenses are not limited. Light emitted from the light-emitting elements is transmitted through and refracted by the first lens region 23b and enters the central region 22a while having a first optical axis that lies in a direction vertical to the lighting substrate 25.

The second lens regions 23c are a plurality of lens shapes formed at positions corresponding to the side regions 22b of the image display part 22. The lens shapes of the second lens regions 23c are formed at positions corresponding to the plurality of light-emitting elements, and each refract light from the corresponding light-emitting element and thereby adjust an optical axis. While FIG. 4 shows an example in which a distal end portion of a cannonball-shaped lens is formed one by one, the shape and the number of lenses are not limited. Light emitted from the light-emitting elements is transmitted through and refracted by the second lens regions 23c, and enters the side regions 22b while having second optical axes that lie in directions inclined toward laterally outer sides from the first optical axis of the first lens region 23b. The support pillars 23d, 23e are pillar-like portions erected on the surface of the flat-plate portion 23a toward the image display part 22, and distal end surfaces thereof contact the back surface side of the image display part 22. As the support pillars 23d, 23e contact the back surface side of the image display part 22, a constant distance between the display surface of the image display part 22 and the flat-plate portion 23a is secured, and the angle of incidence of light entering the central region 22a along the first optical axis and the angles of incidence of light entering the side regions 22b along the second optical axes are determined. The detailed structure of the support pillars 23d, 23e and the details of support for the image display part 22 will be described later.

The through-holes 23f are holes that are provided in the flat-plate portion 23a, on outer sides relative to the second lens regions 23c, and extend from the front surface to the back surface. It is preferable that the through-holes 23f be formed at positions corresponding to through-holes provided in the spacer part 24 and the lighting substrate 25. By inserting positioning pins or fastening members through the through-holes provided in the plurality of members, the plurality of members can be collectively positioned and fixed.

Figure 5:
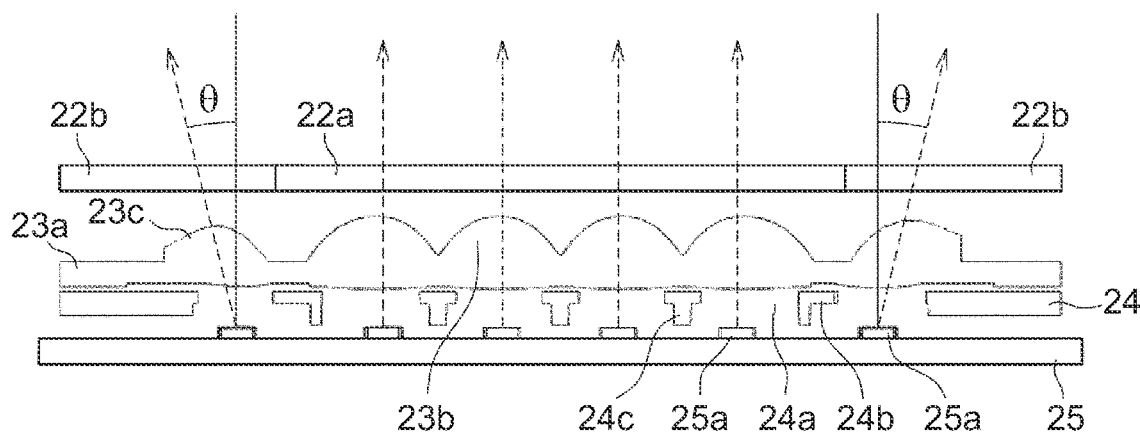
FIG. 5 is a schematic sectional view showing a positional relationship and optical axes in the image formation unit.

FIG. 5 is a schematic sectional view showing a positional relationship and optical axes in the image formation unit. As shown in FIG. 5, the spacer part 24 has openings 24a, first light-blocking walls 24b, and second light-blocking walls 24c. On the front surface of the lighting substrate 25, a plurality of light-emitting elements 25a is mounted.

The openings 24a are openings formed in the spacer part 24, at positions each respectively corresponding to one of the plurality of light-emitting elements 25a. Light emitted from each light-emitting element 25a enters the lens part 23 through the opening 24a at the corresponding position and reaches the image display part 22. In this case, the first optical axis that is the traveling direction of the light entering the first lens region 23b corresponding to the central region 22a (the dashed arrows in the drawings) lies in a direction vertical to the surface of the lighting substrate 25. The second optical axes that are the traveling directions of light entering the second lens regions 23c corresponding to the side regions 22b lie in directions inclined at an angle θ from the direction vertical to the lighting substrate 25 (the solid lines in the drawings) toward the outer sides in the lateral width direction.

In this case, in the central region 22a, the center of the lens shape in the first lens region 23b, the center of the opening 24a, and the position of the light-emitting element 25a overlap one another on the first optical axis as seen in a plan view. Meanwhile, in each side region 22b, the lens shape in the second lens region 23c has a shape of a cannonball-shaped lens being inclined in the direction of the second optical axis, and the center of the opening 24a and the position of the light-emitting element 25a lie on the second optical axis.

The two second lens regions 23c and openings 24a provided on the left and right sides have shapes that are asymmetrical in the left-right direction. This is because, at positions at which light having been transmitted through the left and right openings 24a and second lens regions 23c enters the front windshield, the surface of the front windshield has different inclinations. Therefore, the left and right second lens regions 23c and openings 24a have asymmetrical shapes based on optical design that also takes reflection by the front windshield into account.

The first light-blocking walls 24b are wall-like portions formed on the surface facing the lighting substrate 25, at the positions of the borders between the first lens region 23b and the second lens regions 23c. As the first light-blocking walls 24b are provided, light radiated to the central region 22a and light radiated to the side regions 22b are separated, so that stray light can be prevented.

In particular, in the case where white light is radiated to display an image to be displayed in the central region 22a in full color and light of a specific color, such as umber, is radiated to the side regions, the light-emitting elements 25a mounted in the first lens region 23b and those mounted in the second lens regions 23c are different from each other in the color of light they emit. In such a case, providing the first light-blocking walls 24b can block light that travels in oblique directions from the light-emitting elements 25a and prevent the colors of the central region 22a and the side regions 22b from getting mixed with each other, which can improve the visibility of the projected image.

The second light-blocking walls 24c are wall-like portions formed on the surface facing the lighting substrate 25, between the plurality of light-emitting elements 25a inside the first lens region 23b. Providing the second light-blocking walls 24c can block light that is obliquely radiated from adjacent light-emitting elements 25a and prevent stray light that travels in directions different from that of the first optical axis.

The first light-blocking walls 24b and the second light-blocking walls 24c have such heights as not to reach the surface of the lighting substrate 25, and thus can be prevented from contacting the wiring pattern formed in the surface of the lighting substrate 25 and breaking the wiring pattern through mechanical damage. To effectively prevent stray light, it is necessary to form the first light-blocking walls 24b and the second light-blocking walls 24c to such a height that light obliquely emitted from the light-emitting element 25a disposed immediately under each opening 24a does not pass through the adjacent openings 24a.

As described above, in this embodiment, the central region 22a and the side regions 22b are formed in the display surface, and the first optical axis of the first lens region 23b is vertical to the lighting substrate and the second optical axes of the second lens regions 23c lie in directions inclined toward the laterally outer sides. Thus, by simply positioning the members, the radiation direction of the image displayed in the central region 22a and the radiation directions of the images displayed in the side regions 22b can be varied so as to improve the visibility of the image having been reflected by the magnifying mirror. Further, since the first lens region 23b and the second lens regions 23c are integrally formed and the central region 22a and the side regions 22b are integrally formed, the number of components can be reduced and the assembly work and the optical axis adjustment are made easy.

Since the first light-blocking walls 24b and the second light-blocking walls 24c are provided between the adjacent openings 24a on the back surface side of the spacer part 24, light from the adjacent light-emitting elements 25a is less likely to travel through the openings 24a in oblique directions and constitute stray light, so that the visibility of the projected image can be improved.

Second Embodiment

Figure 6:
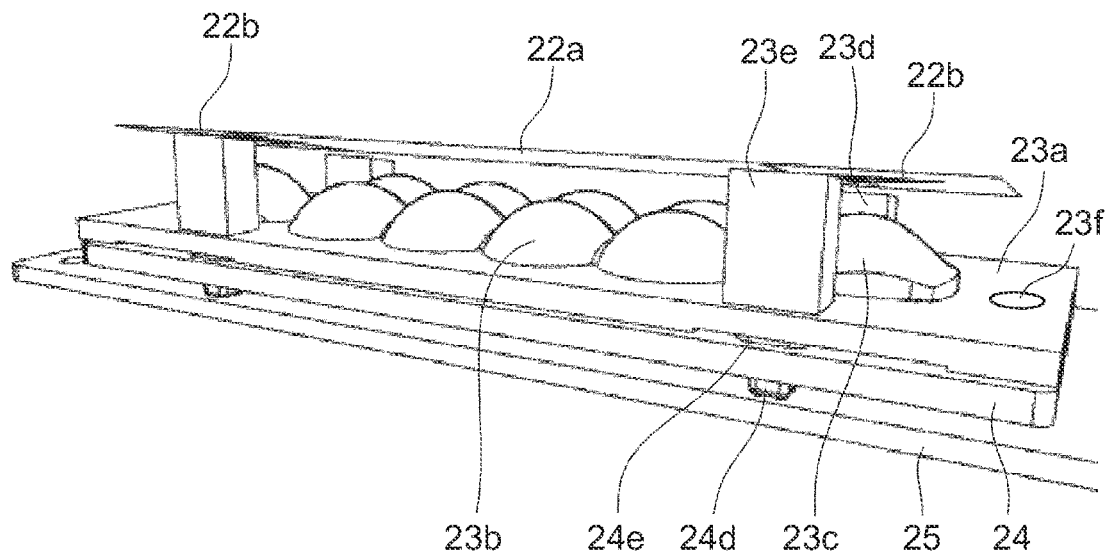
FIG. 6 is a schematic perspective view showing the structure of an image formation unit according to a second embodiment, and shows a state where the image display part 22 is supported by support pillars 23d, 23e.
Figure 7:
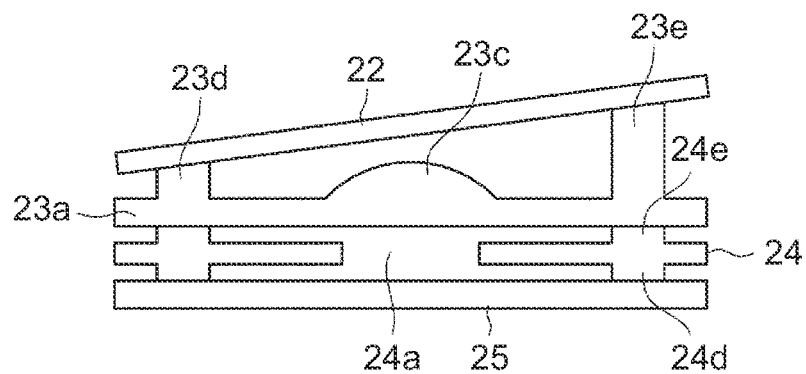
FIG. 7 is a schematic sectional view showing a state where the image display part 22 is supported by the support pillars 23d, 23e.

Next, a second embodiment of the present invention will be described using FIG. 6 and FIG. 7. Description of contents overlapping with the first embodiment will be omitted. FIG. 6 is a schematic perspective view showing the structure of an image formation unit according to the second embodiment, and shows a state where the image display part 22 is supported by the support pillars 23d, 23e. FIG. 7 is a schematic sectional view showing a state where the image display part 22 is supported by the support pillars 23d, 23e. The spacer part 24 has second ribs 24d formed on the back surface side and first ribs 24e formed on the front surface side. The detailed structure of the spacer part 24 will be described later.

As shown in FIG. 6 and FIG. 7, the support pillar 23d and the support pillar 23e formed on the lens part 23 are different from each other in height, and distal end surfaces thereof form the same inclined surfaces and contact the back surface of the image display part 22. Distal ends of the support pillars 23d, 23e each contact the borders between the central region 22a and the side region 22b of the image display part 22. Thus, the image display part 22 is disposed so as to be inclined at a predetermined angle relative to the lighting substrate 25 and the flat-plate portion 23a. While the angle of inclination of the distal end surfaces of the support pillars 23d, 23e is not limited, it is preferable that they be inclined, for example, within a range of 10 degrees to 15 degrees.

In this embodiment, as shown in FIG. 3, when the image display part 22 is disposed along an up-down direction in the drawing, the lens part 23, the spacer part 24, and the lighting substrate 25 are disposed so as to be inclined. That is, light radiated along the first optical axis that lies in the direction vertical to the lighting substrate 25 enters the central region 22a at an inclined angle. Light transmitted through the image display part 22 is emitted from the PGU 20, then reflected by the flat mirror 30 and the magnifying mirror 40, transmitted through the translucent cover 60, and reflected by the front windshield of the vehicle to be visually recognized by an occupant as a virtual image. Since the front windshield is disposed so as to be inclined relative to a front-rear direction of the vehicle, the visibility of the image displayed on the image display part 22 and projected as a virtual image can be improved as light travels at the angle at which the image display part 22 is inclined.

As described above, in this embodiment, the support pillars 23d, 23e are integrally formed in the lens part 23, and the distal end surfaces thereof formed as the same inclined surfaces contact the back surface of the image display part 22 to secure a distance between the image display part 22 and the lens part 23 as well as to keep a constant angle of inclination relative to the flat-plate portion 23a. Thus, the number of components can be reduced to make the assembly work and the optical axis adjustment easy, and the visibility of the projected image can be improved.

Third Embodiment

Figure 8:
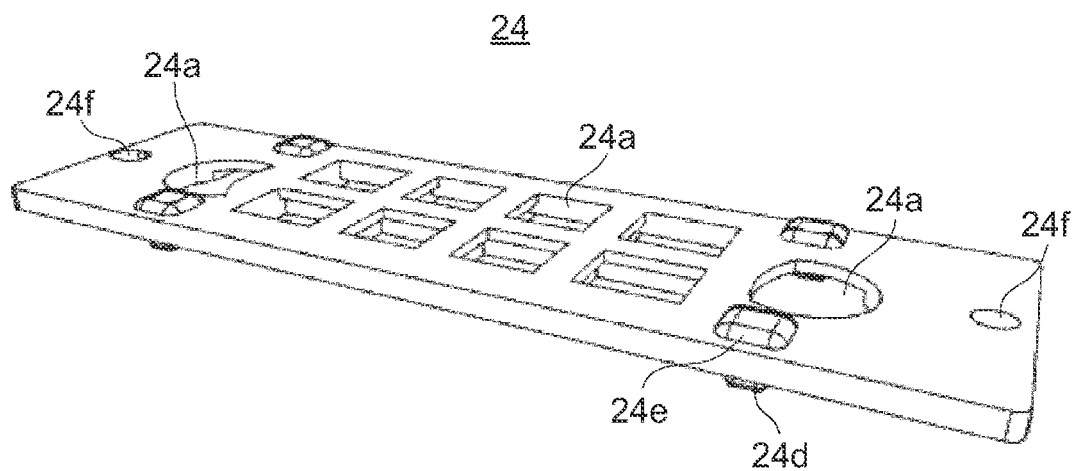
FIG. 8 is a schematic perspective view according to a third embodiment showing the structure of a spacer part 24 on a front surface side that faces a lens part 23.
Figure 9:
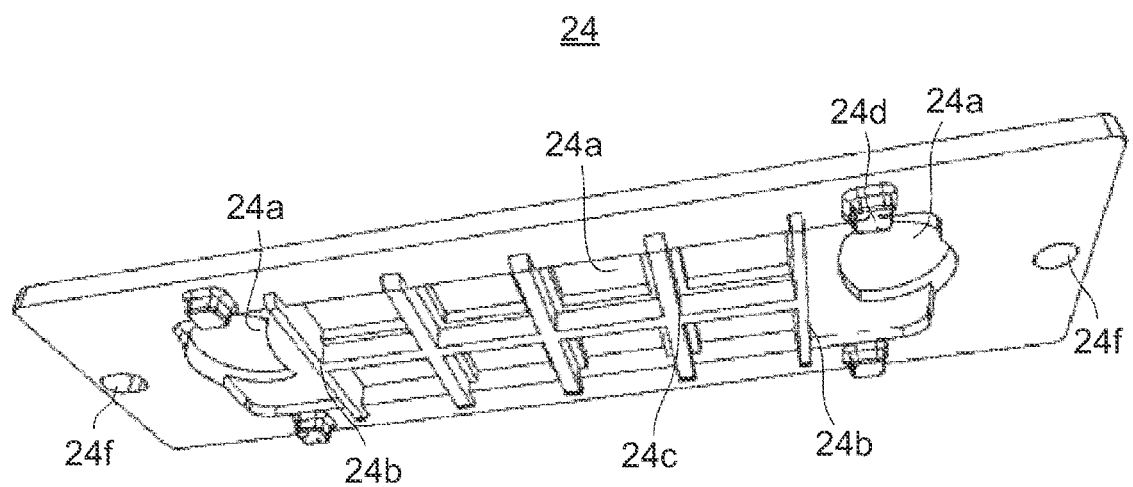
FIG. 9 is a schematic perspective view showing the structure of the spacer part 24 on a back surface side that faces a lighting substrate 25.
Figure 10:
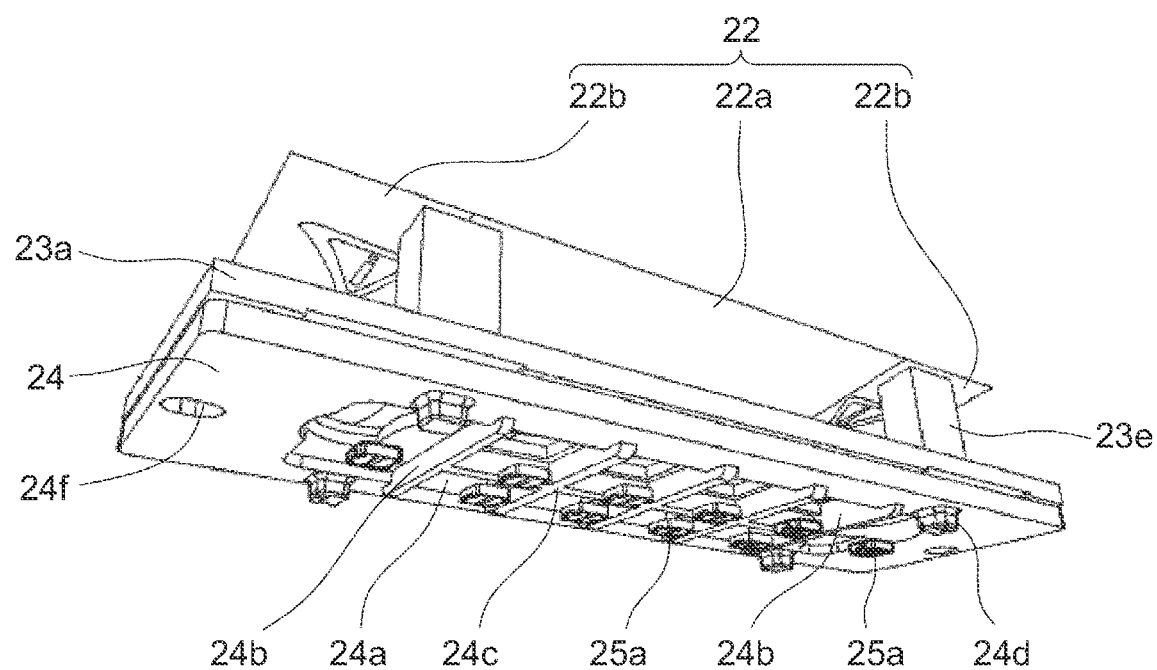
FIG. 10 is a schematic perspective view showing an image formation unit except for the lighting substrate 25.

Next, a third embodiment of the present invention will be described using FIG. 8 to FIG. 10. Description of contents overlapping with the first embodiment will be omitted. FIG. 8 is a schematic perspective view according to the third embodiment showing the structure of the spacer part 24 on the front surface side that faces the lens part 23. FIG. 9 is a schematic perspective view showing the structure of the spacer part 24 on the back surface side that faces the lighting substrate 25. FIG. 10 is a schematic perspective view showing an image formation unit except for the lighting substrate 25.

As shown in FIG. 8 and FIG. 9, the flat-plate spacer part 24 is provided with the openings 24a, the first light-blocking walls 24b, the second light-blocking walls 24c, the first ribs 24e, the second ribs 24d, and through-holes 24f. As shown in FIG. 10, the openings 24a are formed at positions corresponding to the plurality of light-emitting elements 25a mounted on the lighting substrate 25.

The second ribs 24d are protruding portions formed on the back surface side of the spacer part 24. The first ribs 24e are protruding portions formed on the front surface side of the spacer part 24. Distal ends of the second ribs 24d and the first ribs 24e have flat surfaces. In the example shown in FIG. 8 and FIG. 9, four second ribs 24d and four first ribs 24e are provided on the outer sides relative to the first light-blocking walls 24b in the lateral width direction and formed so as to overlap each other as seen in a plan view.

The height of the second ribs 24d is larger than the height of the first light-blocking walls 24b and the second light-blocking walls 24c, and when the image formation unit is assembled, the distal end surfaces contact the surface of the lighting substrate 25. The plurality of second ribs 24d has the same height, and as the second ribs 24d contact the surface of the lighting substrate 25, a constant interval between the surface of the lighting substrate 25 and the spacer part 24 is maintained. It is preferable for the formation positions of the second ribs 24d that positions so as to avoid the wiring pattern formed in the lighting substrate 25 are secured as contact regions, and that the distal ends of the second ribs 24d contact these contact regions. Thus, the second ribs 24d can be prevented from contacting the wiring pattern formed in the surface of the lighting substrate 25 and breaking the wiring pattern through mechanical damage.

The plurality of first ribs 24e has the same height, and as the first ribs 24e contact the surface of the lens part 23, a constant interval between the surface of the spacer part 24 and the lens part 23 is maintained. Thus, disposing the spacer part 24 between the lighting substrate 25 and the lens part 23 allows a constant interval between the lighting substrate 25 and the lens part 23 to be maintained. Here, since the second ribs 24d and the first ribs 24e are formed at the same positions as seen in a plan view, the spacer part 24 is less likely to deform even when an external force is applied between the lens part 23 and the lighting substrate 25.

As shown in FIG. 6 and FIG. 7, it is preferable that the second ribs 24d and the first ribs 24e be formed at the same positions as the support pillars 23d, 23e as seen in a plan view. When the support pillars 23d, 23e are thus aligned with the second ribs 24d and the first ribs 24e in a straight line from the lighting substrate 25 to the image display part 22, the spacer part 24 and the lens part 23 are less likely to deform even when an external force is applied to the image formation unit.

When the spacer part 24 or the lens part 23 deforms due to an external force, the interval between or the positions of the lighting substrate 25 and the lens part 23 change, causing misalignment of the optical axes of the light-emitting elements 25a and the lens part 23. Therefore, the support pillars 23d, 23e are disposed in a straight line with the second ribs 24d and the first ribs 24e to thereby reduce the likelihood of deformation of the spacer part 24 and misalignment of the optical axes.

As shown in FIG. 10, the distal ends of the support pillars 23d, 23e contact the borders between the central region 22a and the side regions 22b of the image display part 22. At the borders between the central region 22a and the side regions 22b, there is a bezel portion etc. of the transmissive liquid crystal panel, and thus there is a region that does not contribute to displaying an image. Having the distal ends of the support pillars 23d, 23e contact regions that do not contribute to displaying an image can reduce the influence that holding the image display part 22 by the support pillars 23d, 23e has on displaying and projecting an image.

Since the support pillars 23d, 23e are integrally formed as portions of the lens part 23, it is preferable that light-blocking films be formed on the side surfaces and the distal end surfaces when the lens part 23 is formed by a translucent material. Thus, light having passed through the openings 24a is less likely to enter the side surfaces of the support pillars 23d, 23e and constitute stray light, so that degradation of the visibility of the projected image can be prevented. Alternatively, the lens part 23 may be formed by two-color molding using a light-blocking resin material for the portions of the support pillars 23d, 23e and using a translucent resin material for the other portions of the lens part 23.

The through-holes 24f are holes that are provided at both ends of the spacer part 24 in the lateral width direction and extend from the front surface to the back surface. It is preferable that the through-holes 24f be formed at positions corresponding to the through-holes 23f provided in the lens part 23. By inserting positioning pins or fastening members into the through-holes 23f, 24f provided in the plurality of members, the plurality of members can be collectively positioned and fixed.

As described above, in this embodiment, the first ribs 24e and the second ribs 24d are formed at the same positions as seen in a plan view, and the distal ends of the second ribs 24d contact the lighting substrate 25 and the first ribs 24e contact the lens part 23. The support pillars 23d, 23e are also formed at the same positions as the first ribs 24e and the second ribs 24d as seen in a plan view. Thus, even when an external force is applied to the image formation unit, deformation of the lens part 23 and the spacer part 24 and misalignment of the optical axes are less likely to occur.

Fourth Embodiment

Next, a fourth embodiment of the present invention will be described. Description of contents overlapping with the first embodiment will be omitted. While the example in which the side regions 22b are formed by translucent plate-shaped members and a fixed image is displayed thereon has been shown in the first embodiment, the side regions 22b may be formed by image display elements.

When the side regions 22b are formed by image display elements, such as transmissive liquid crystal panels, the images displayed in the side regions 22b can also be changed with time and the amount of information of the projected image can be increased.

The central region 22a and the side regions 22b may be formed by separate image display elements, or the side regions 22b and the central region 22a may be formed by the same image display element. An example of the same image display element is a transmissive liquid crystal panel having a large lateral width. When the side regions 22b and the central region 22a are formed by the same image display element, wiring, a power source, a controller, etc. can be shared to thereby reduce the number of components and achieve weight reduction and electrical power saving.

The present invention is not limited to each of the above-described embodiments, and various changes can be made within the scope shown in the claims. Embodiments that are obtained by appropriately combining technical means respectively disclosed in different embodiments are also included in the technical scope of the present invention.

This international application claims priority based on Japanese Patent Application No. 2020-151138 that is a Japanese patent application filed on Sep. 9, 2020, and the entire contents of Japanese Patent Application No. 2020-151138 that is a Japanese patent application are incorporated in this international application by reference.

The above description of the specific embodiments of the present invention has been presented for the purpose of showing examples. They are not intended to be comprehensive or restrict the present invention to the described form as is. It is obvious to those skilled in the art that numerous modifications and changes are possible in light of the contents described above.

REFERENCE SIGNS LIST

100 Image projector
10 Casing
20 PGU
30 Flat mirror
40 Magnifying mirror
50 Top plate
60 Translucent cover
21 Front housing
21a Opening
21b Positioning pin
22 Image display part
22a Central region
22b Side region
22c Fixed image
23 Lens part
23a Flat-plate portion
23b First lens region
23c Second lens region
23d, 23e Support pillar
23f Through-hole
24 Spacer part
24a Opening
24b First light-blocking wall
24c Second light-blocking wall
24d Second rib
24e First rib
24f Through-hole
25 Lighting substrate
25a Light-emitting element
26 Control board
27 Rear housing

The invention claimed is:

1. An image projector comprising:
a lighting substrate on which a plurality of light-emitting elements is mounted;
a lens part that adjusts an optical axis of emitted light from the light-emitting elements; and
an image display part which displays an image on a display surface based on an image signal, and through the display surface of which the emitted light is transmitted as transmitted light, wherein:
the display surface has a central region located at a center in a width direction and side regions located on both sides of the central region;
in the lens part, a first lens region formed at a position corresponding to the central region and second lens regions formed at positions corresponding to the side regions are integrally formed;
radiation directions of light having passed through the second lens regions are more inclined toward laterally outer sides than a radiation direction of light having passed through the first lens region; and
of the image display part, the central region is formed by a transmissive liquid crystal panel and the side regions are fixed display panels on which a specific image is fixed.

2. The image projector according to claim 1, comprising a diffusion sheet that covers a surface of the transmissive liquid crystal panel, wherein the fixed display panels are regions to which the diffusion sheet is extended and in which the specific image is fixed.

3. An image projector comprising:
a lighting substrate on which a plurality of light-emitting elements is mounted;
a lens part that adjusts an optical axis of emitted light from the light-emitting elements; and
an image display part which displays an image on a display surface based on an image signal, and through the display surface of which the emitted light is transmitted as transmitted light, wherein:
the display surface has a central region located at a center in a width direction and side regions located on both sides of the central region;
in the lens part, a first lens region formed at a position corresponding to the central region and second lens regions formed at positions corresponding to the side regions are integrally formed; and
radiation directions of light having passed through the second lens regions are more inclined toward laterally outer sides than a radiation direction of light having passed through the first lens region;
further comprising, between the lighting substrate and the lens part, a spacer part that has openings formed at positions corresponding to the light-emitting elements, wherein, on a surface of the spacer part that faces the lighting substrate, a first light-blocking wall extending toward the lighting substrate is provided between the first lens region and a second lens region of the second lens regions.

4. The image projector according to claim 3, wherein, on the surface of the spacer part that faces the lighting substrate, a second light-blocking wall extending toward the lighting substrate is provided between the plurality of light-emitting elements inside the first lens region.

5. The image projector according to claim 3, wherein:
in the spacer part, a first rib of which a distal end contacts the lens part is formed on a front surface and a second rib of which a distal end contacts the lighting substrate is formed on a back surface; and the first rib and the second rib are formed at a same position as seen in a plan view.

6. The image projector according to claim 5, wherein the second rib contacts a region so as to avoid a wiring pattern on the lighting substrate.

7. An image projector comprising:
a lighting substrate on which a plurality of light-emitting elements is mounted;
a lens part that adjusts an optical axis of emitted light from the light-emitting elements; and
an image display part which displays an image on a display surface based on an image signal, and through the display surface of which the emitted light is transmitted as transmitted light, wherein:
the display surface has a central region located at a center in a width direction and side regions located on both sides of the central region;
in the lens part, a first lens region formed at a position corresponding to the central region and second lens regions formed at positions corresponding to the side regions are integrally formed; and
radiation directions of light having passed through the second lens regions are more inclined toward laterally outer sides than a radiation direction of light having passed through the first lens region;
the lens part has a flat-plate portion that is integrally formed with the first lens region and the second lens regions;
a plurality of support pillars is erected on the flat-plate portion toward the image display part; and
distal end surfaces of the support pillars form a same inclined surfaces and contact a back surface of the image display part.

8. The image projector according to claim 7, wherein distal ends of the support pillars contact borders between the central region and the side regions.

* * * * *